(12) United States Patent
Picard et al.

(10) Patent No.: US 9,475,528 B2
(45) Date of Patent: Oct. 25, 2016

(54) SYSTEM AND METHOD FOR DELIVERY OF SALT (71) Applicant: Step Saver, Inc., Woods Cross, UT (US)

(72) Inventors: William F Picard, Kaysville, UT (US); Charles J Steffl, Bellview, MN (US)

(73) Assignee: Step Saver, Inc., Woods Cross, UT (US)

( * ) Notice: Subject to any disclaimer, the term of this patent is extended or adjusted under 35 U.S.C. 154(b) by 137 days.

(21) Appl. No.: 14/135,199

(22) Filed: Dec. 19, 2013

(65) Prior Publication Data
US 2015/0175365 A1 Jun. 25, 2015

(51) Int. Cl.
*B60P 1/60* (2006.01)
*B62D 63/04* (2006.01)
*B01J 49/00* (2006.01)
*B65G 53/22* (2006.01)
*B65G 69/18* (2006.01)

(52) U.S. Cl.
CPC ............ *B62D 63/04* (2013.01); *B01J 49/0086* (2013.01); *B60P 1/60* (2013.01); *B65G 53/22* (2013.01); *B65G 69/183* (2013.01)

(58) Field of Classification Search
CPC .................................. B65G 65/32; B60P 1/60
USPC ....................................................... 406/13, 39
See application file for complete search history.

(56) References Cited

U.S. PATENT DOCUMENTS

| | | | |
|---|---|---|---|
| 2,793,773 A | 5/1957 | De Boliac | |
| 3,034,543 A | 5/1962 | Du Bois | |
| 3,880,212 A | 4/1975 | Harris | |
| 4,082,124 A | 4/1978 | Jenkins | |
| 4,114,661 A | 9/1978 | Harris | |
| 4,641,693 A | 2/1987 | Rakucewicz | |
| 4,987,409 A | 1/1991 | Jackson | |
| 5,029,602 A | 7/1991 | McKinney et al. | |
| 5,240,043 A | 8/1993 | Campbell | |
| 5,445,192 A * | 8/1995 | Hansen | B01J 49/0086 137/360 |
| 6,561,387 B1 * | 5/2003 | Slawson | B01J 47/10 137/360 |
| 7,305,924 B2 * | 12/2007 | Steffl | F23G 5/444 110/108 |

* cited by examiner

*Primary Examiner* — William R Harp
(74) *Attorney, Agent, or Firm* — Merchant & Gould P.C.

(57) ABSTRACT

A salt delivery system operates to remotely deliver water softening salt to a salt bin located inside a structure. The salt delivery system is positioned on a vehicle and includes a hopper apparatus for holding salt, a computerized scale system for weighing salt actually delivered to the bin, a salt delivery hose connected between the structure and hopper apparatus, a funnel cone positioned above the remotely located salt bin, and a pipe connected between the salt bin and the structure.

18 Claims, 6 Drawing Sheets

SYSTEM AND METHOD FOR DELIVERY OF SALT

BACKGROUND

Water softeners are commonly used in residences and businesses to soften hard water; i.e., water containing minerals such as calcium, magnesium, and iron. The water softening process causes ions of such minerals to be replaced by sodium ions on a continuous basis as hard water is supplied to the water softener from an external source. Because this process is continuous, the salt, which is normally kept in a bin adjacent to the water softener, must be replenished periodically.

Salt used in a water softening process typically takes the form of rock salt, evaporated solar salt, or salt pellets, which is typically sold in bags of various sizes. Based on the amount of salt used in a water softening process, even the smallest salt bags tend to be somewhat large, bulky and heavy.

Normally, when the salt is replenished, the homeowner must first purchase bags of salt, load the bag(s) into a vehicle, and unload and carry the bag(s) to the water softener which is oftentimes located on the lower level of a residence or a business. Each bag must then be opened, lifted and emptied into the salt bin. In addition to the fact that the salt bags are heavy, emptying them generally produces salt dust, which results from abrasive action between the salt pellets or evaporated solar salt during transport. This dust settles on the surrounding equipment and floor, leaving a dusty environment that is difficult to clean.

Alternatively, if the home owner uses a water softening service, the servicing personnel must load the delivery truck with numerous bags of salt sufficient for a particular route, and these bags must be unloaded, carried into the residence or business and emptied in the same manner. The fact that the servicing personnel must enter the residence or business means that the home owner must either be at home at the time of delivery, or must provide the servicing personnel with some means for entering the home. Many home and business owners are hesitant to do this, particularly where there is some degree of turnover in servicing personnel.

SUMMARY

In general terms, this disclosure is directed to a method for remotely delivering water softening salt to a salt bin. Various aspects are described in this disclosure, which include, but are not limited to the following aspects.

One aspect is a method for remotely filling a salt bin with salt, the method comprising filling a hopper apparatus with salt, wherein the hopper apparatus is positioned on a vehicle, wherein the vehicle includes a salt delivery hose and the hopper apparatus includes a gate valve and a pressure sensor. The method further includes weighing the salt in the hopper apparatus using a computerized scale system; transporting the hopper apparatus to a first location, the first location being proximate to the salt bin; connecting a first end of the salt delivery hose to an outlet of the hopper apparatus; connecting a second end of the salt delivery hose to a connector; opening the gate valve at the hopper apparatus to allow salt to move from the hopper apparatus to the salt delivery hose. Additionally, the method includes delivering air pressure from the hopper apparatus through the salt delivery hose to the salt bin; utilizing the pressure sensor to detect an increase in pressure; reversing a direction of the air pressure to reclaim salt in the salt delivery hose to the hopper apparatus; and weighing the salt in the hopper apparatus using a computerized scale system after delivering the salt.

A second is aspect is directed to a system for remotely delivering salt to a salt bin, the system comprising a vehicle; a computerized scale system; and a hopper apparatus having an outlet, a gate valve, and a pressure sensor, wherein the hopper apparatus and the computerized scale system are positioned on the vehicle. The system further includes a structure having an interior wall and an accessible exterior wall, wherein a first connector is positioned on the exterior wall and a second connector is positioned on an interior wall; a salt bin positioned inside the structure; a funnel cone having a narrow opening on a first end and a wide opening on a second end wherein the funnel cone is positioned above the salt bin; and a first pipe having a first end and a second end, wherein the first end is connected to the narrow opening and the second end is connected to the second connector. Finally the system includes a salt delivery hose having a first end and a second end, wherein the first end of the salt delivery hose is connected to the first connector positioned on the exterior wall and the second end of the salt delivery hose is connected to the outlet of the hopper apparatus.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure describes an integrated approach for delivering salt to a salt bin located inside a residence or business using a salt delivery apparatus without the need to enter the residence or the business. In some embodiments, the salt delivery apparatus includes several hoppers, positioned on a truck, for storing water softening salt. In operation, the portability of the salt delivery apparatus enables it to be transported by the truck from location to location. The entire salt delivery process is accomplished quickly, without the need for the operator to enter the residence or business. In embodiments, the operator moves solely between the truck and an external house coupling, without having to unload and carry several heavy salt bags into the residence or business, lift, and empty them into the salt bin. The salt delivery system disclosed herein also makes use of less expensive salt in bulk form, eliminating the need for more expensive bags of salt as well as the difficulty of loading, transporting, unloading, carrying, and emptying salt bags. In some example embodiments, a hopper of a salt delivery apparatus may hold up to or exceeding 3500 pounds of salt, thereby greatly reducing the number of plastic salt bags discarded into waste. As disclosed herein, the system will accept a variety of types and/or sizes of salt grains.

Figure 1:
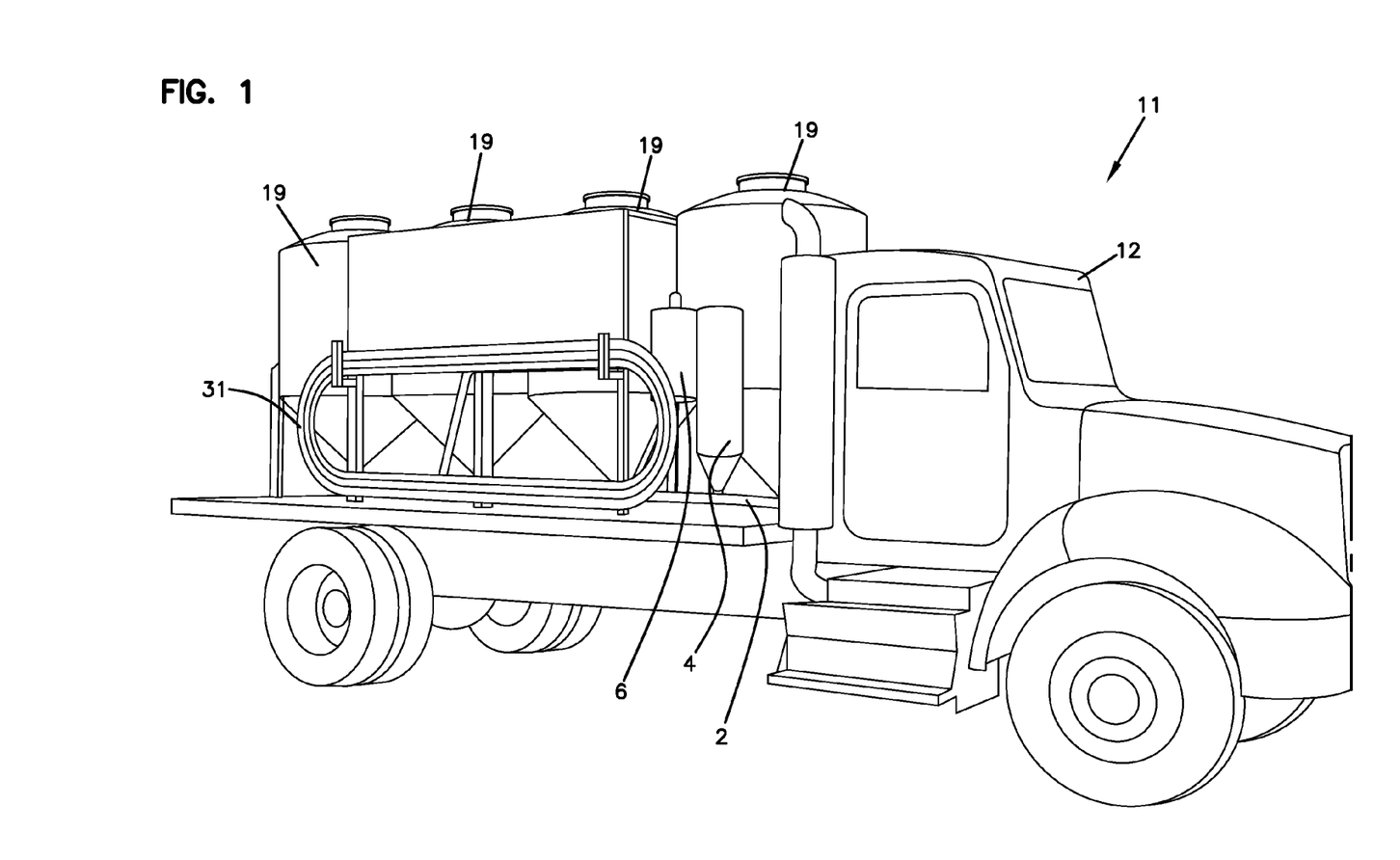
FIG. 1 is a perspective view of a salt delivery apparatus disposed in the bed of a truck.

FIG. 1 is a perspective view of a salt delivery apparatus 11 disposed in the bed of a truck 12. In this embodiment, the salt delivery apparatus 11 includes four hoppers 19 for storing water softening salt, an electronic pump system, and a salt delivery hose 31. Although four individual hoppers 19 are shown, it is understood by one skilled in the art that more or fewer hoppers 19 may alternatively be implemented in the salt delivery apparatus 11. As described in further detail below, each of the hoppers 19 are connected using a main feed pipe 2 and a series of valves so that only one hopper is used to deliver salt during any particular salt delivery.

In addition, each hopper 19 rests on a computerized scale (not shown), wherein the scale is used to weigh the salt delivered during each delivery. In some embodiments, the computerized scale is approved by the National Type Evaluation Program and certified for weights and measures. The computerized scale system enables operators to accurately calculate the amount of salt delivered to a particular salt bin located inside a residence or a business. In embodiments, each salt delivery is accompanied by a scale ticket that indicates the amount of salt delivered to the particular salt bin. In example embodiments, a computerized scale can be associated with or weigh each hopper individually; in alternative embodiments, a single computerized scale can be used to collectively weigh the hoppers 19. It is understood that the certified computerized scale, since it is intended to determine an amount of salt delivered, is capable of determining a difference between a pre-delivery and a post-delivery weight of salt in hoppers 19.

Also shown in FIG. 1 is a recovery tank 4 and a recovery filter 6 positioned on the truck 12. The recovery tank 4 is used to reclaim and store excess salt delivered to the salt bin that would otherwise remain in the pipes that are used to transport the salt from the external house coupling to the bin. The recovery tank 4 is used to store the salt while the recovery filter 6 is used to filter salt dust from the air. Once the reclaiming process is complete, a salt delivery ticket is printed, including the amount of salt delivered to the bin itself and excluding the amount of salt reclaimed and stored in the recovery tank 4.

In some embodiments, the computerized scale discussed above is further associated with the recovery tank 4, and can weigh the recovery tank 4 to determine an amount of salt retrieved during a recovery process. In further embodiments, a separate computerized scale can be used to weigh the recovery tank 4, with the weight measurements incorporated with the weight measurements of hoppers 19 to determine an overall weight of salt delivered to a business or residence, as further discussed below.

Figure 2:
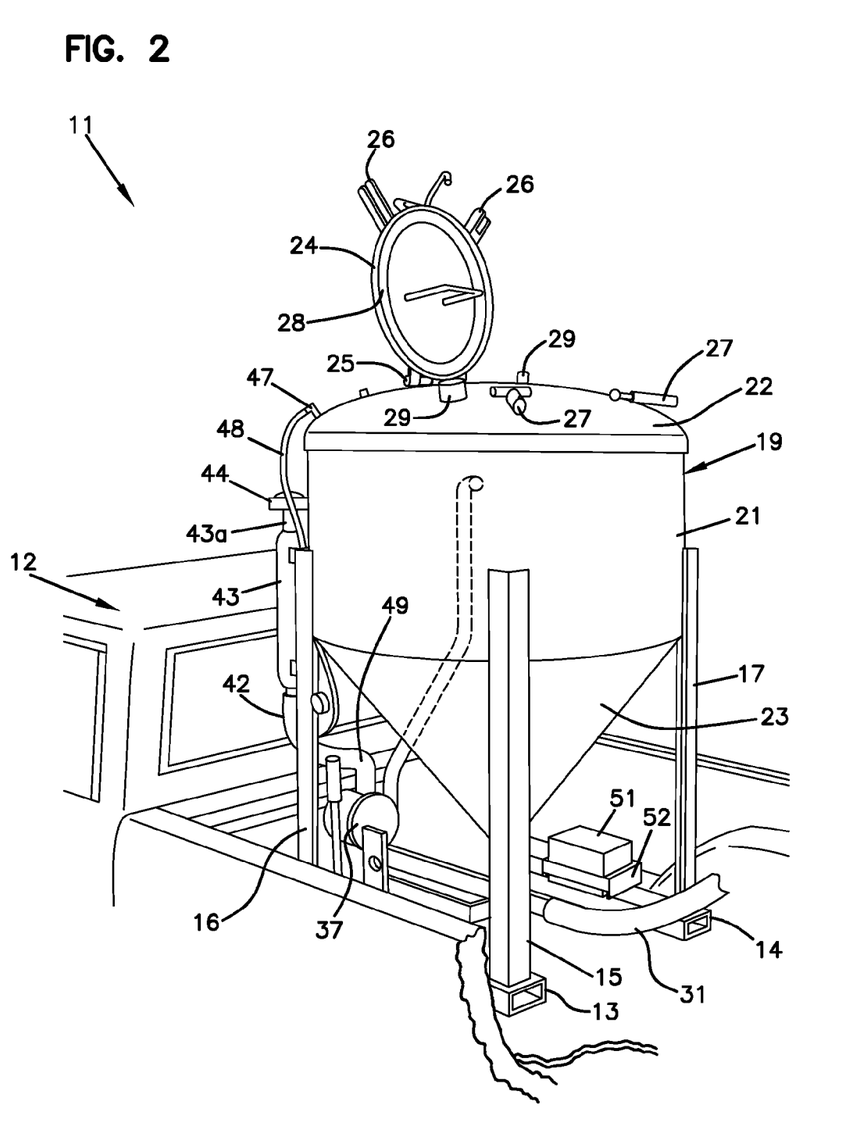
FIG. 2 is a schematic perspective view of a salt delivery apparatus.

FIG. 2 is a schematic perspective view of a salt delivery apparatus 11. In this embodiment, the apparatus 11 is made of rust-free stainless steel, thereby ensuring rust cannot contaminate the salt contained therein. In other embodiments, other suitable materials may also be used, including, but not limited to metal, aluminum, and/or plastic.

The apparatus 11 comprises a pair of horizontally disposed, parallel frame members 13, 14 that form the base of the apparatus 11. Frame members 13, 14 each comprise an elongated tube of rectangular cross section. The spacing of the frame members 13, 14 and the internal size of these members permits the entry of the prongs of a conventional forklift, enabling the apparatus 11 to be lifted into and removed from the bed of a truck 12.

With additional reference to FIG. 2, two vertically disposed frame members 15, 16 are secured to and project vertically upward from the frame member 13 at the respective ends thereof, and vertical frame members 17, 18 (not shown) are secured to and project upward from horizontal frame member 14 in a like manner. In some embodiments, all four of the vertical frame members 15-18 are formed from angle iron with the inner faces thereof facing inward to receive and support a hopper 19 that receives and stores water softening salt.

In an embodiment, the hopper 19 is sealed, comprising a cylindrical main portion 21, a dome-shaped top 22 and a frustroconical lower portion 23. The domed top 22 has a centrally disposed circular opening (not shown) which is sealed by a circular lid 24 that is pivotally mounted to the top 22 by a hinge 25. Sealed top 24 includes a pair of laterally projecting bifurcated ears 26 that interlockably engage a pair of handle clamps 27 when the cover is placed in sealing position. The handle clamps 27 interlockably engage the bifurcated ears 26 and operate in an over-center manner when lowered to clamp the lid 24 in sealed relation to top 22. A resilient annular seal 28 is disposed on along the inner peripheral edge of lid 24 to affect an air tight seal with top 22. A pressure relief valve 29 is carried by the dome-shaped top 22.

Figure 3:
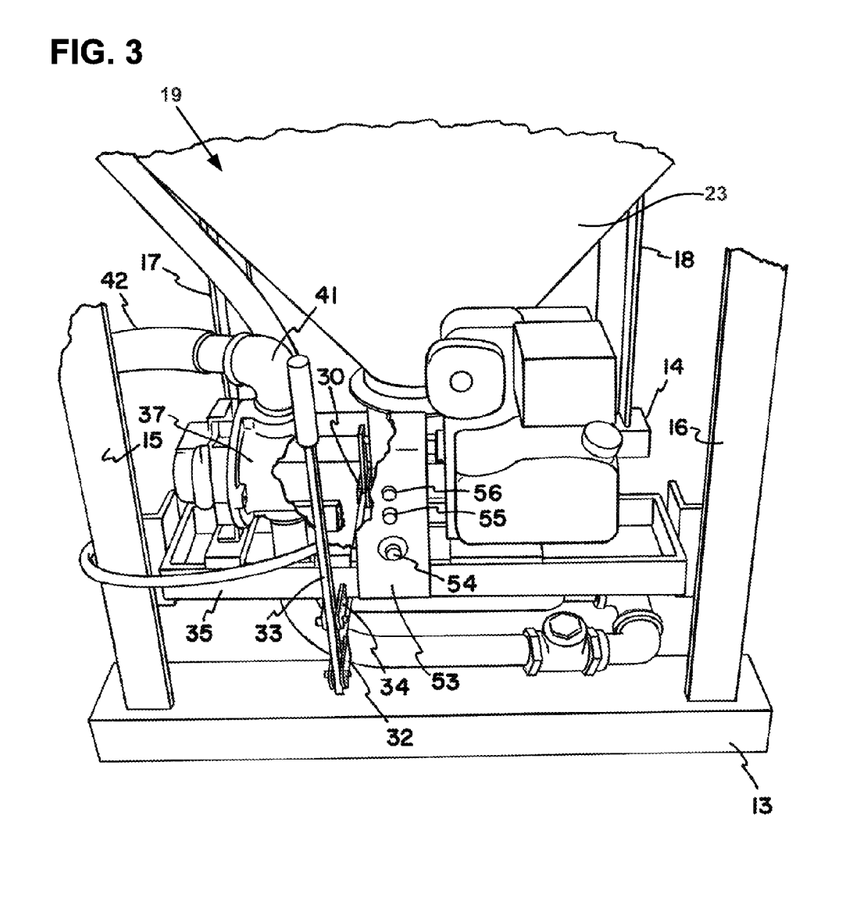
FIG. 3 is an enlarged side view of the salt delivery apparatus.

With reference to FIGS. 2 and 3, the extreme lower end of the frustroconical portion 23 of the hopper 19 includes an outlet fitting having a gate valve 30, leading to a salt delivery hose 31. The gate valve 30 is actuated by a horizontal linkage member 32 (FIG. 3) which is moved by a handle member 33. A fixed linkage member 34 is secured to a cross frame member 35. The handle member 33 is pivotally connected to both of the linkage members 32, 34, enabling the user to open the gate valve 30 by pushing the handle member 33, and to close the gate valve by pulling the handle member 33. Additionally, a gasoline engine 36 is mounted to the cross frame member 35.

FIG. 2 also includes an air pump 37 that is powered using the tuck's power-take off 36. The air pump 37 is used to pump air in order to move salt from the hopper 19 and/or the recovery tank 4 to the salt bin. In an embodiment, the air pump 37 produces a relatively low pressure output. The air pump 37 additionally includes a pressure regulating valve (not shown) to control its output. In some embodiments, the output is about three psi.

As shown in FIGS. 2 and 3, an inlet fitting 41 is secured to the inlet of air pump 37, which is positioned on its top surface. As shown in FIG. 2, a flexible hose 42 interconnects the inlet fitting 41 and a vertically disposed air intake 43. A rain cap 44 prevents rain from entering air intake 43.

As shown in FIG. 2, the air inlet 43a of the air intake 43 has a smaller inside diameter than that of the main body of air intake 43. As such, when air is drawn through the air inlet 43a, it expands into the main body portion, reducing pressure and causing moisture in the air to condense before entering the air pump. The purpose of this moisture condensing function is to maintain the salt in hopper 19 as dry as possible, thus preventing the salt from sticking together and ensuring a smooth flow during the discharge operation.

With continued reference to FIGS. 2 and 3, an air outlet pipe or hose 42 leads from an outlet fitting of air pump 37 (not shown) and it connects to an elbow fitting 41 secured to the side of hopper 19. As discussed above, in some embodiments, the outlet pressure of the air pump 37 is around 3 psi and this pressure is communicated through hose 42 and fitting 41 to the inside of sealed hopper 19, exerting pressure in this amount on the salt previously filled. Further, because of the relatively low speed of air pump 37, it tends to produce a pulsating effect which enhances the discharge and delivery of salt as discussed in further detail below.

As shown in FIG. 2, a small pressure fitting 47 is mounted on the dome shaped top 22 of the hopper 19. A flexible pressure tube 48 leads from fitting 47 to a pressure gauge 49, thus enabling the operator to monitor pressure within hopper 19. As indicated above, a pressure relief valve 29 is also mounted on dome shaped top 22, and if pressure within hopper 19 reaches a limit of about 15 psi, pressure relief valve 29 will open. As a practical matter, if pressure within hopper 19 exceeds about two to four psi, and in some embodiments exceeds about three psi by a significant amount, the back pressure that is communicated through hose 42 to air pump 37 may back load the pump and hence engine 36, resulting in stoppage of engine 36.

Additionally, the salt delivery hose 31 is of sufficient length to reach from the salt delivery apparatus 11 to the external residence or business coupling as described in further detail below. In some embodiments, salt delivery hose 31 is 150 feet in length. In other embodiments, other lengths are used.

Figure 4:
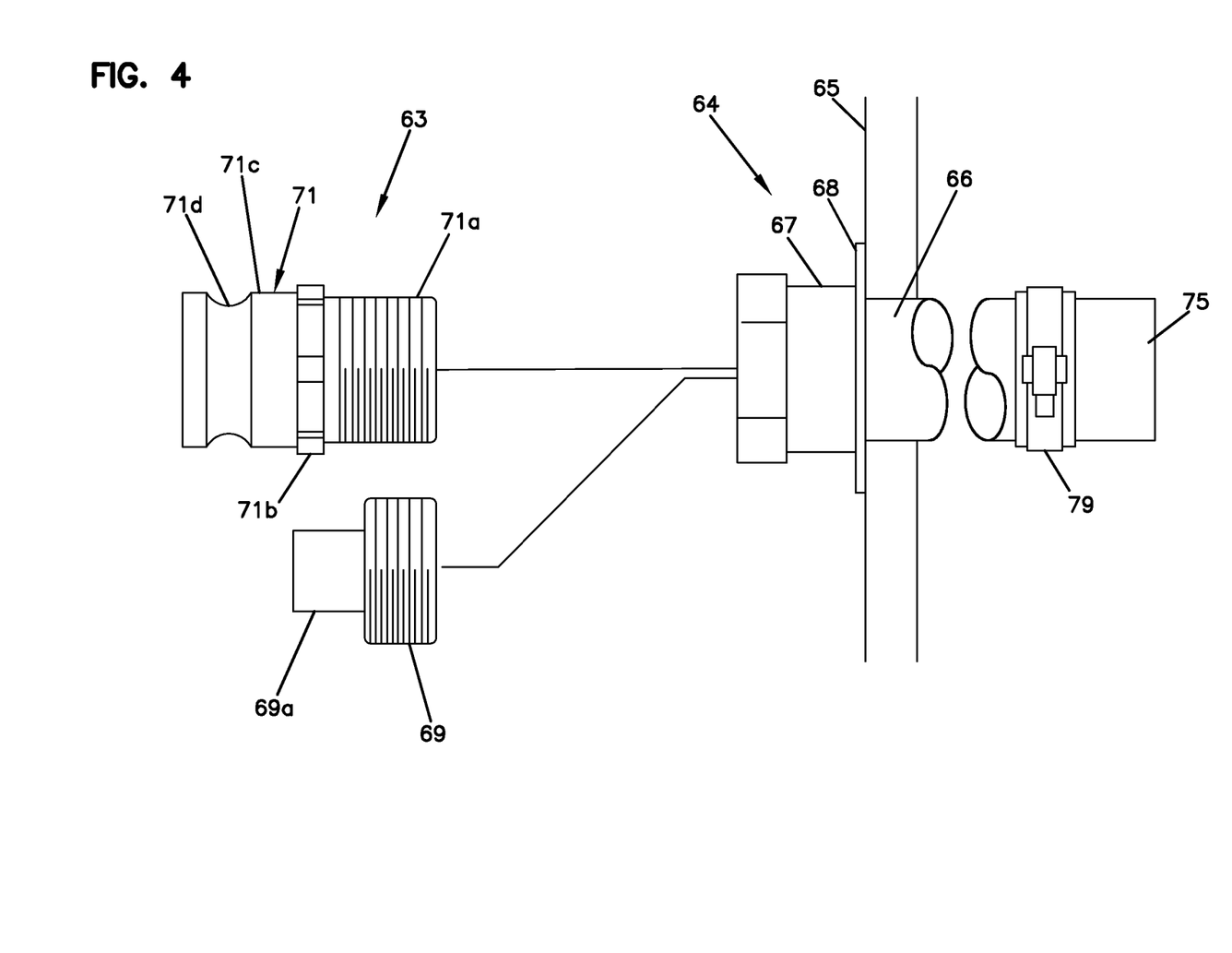
FIG. 4 is a side view of piping coupled between the salt delivery apparatus and a residence.

With reference to FIG. 4, the hose coupling 63 is sealably interconnectible with an external residence coupling 64. This coupling projects through an external residential or business wall 65, and includes an internal portion taking the form of a pipe 66 and an external portion including an internally threaded coupling 67 and a flange 68 that lies against the residential or business wall 65. Normally, an externally threaded plug 69 is screwed into the coupling 67 to close it. A square projecting boss 69a enables the plug 69 to be wrenched in or out. At the time of a salt delivery, plug 69 is removed and replaced with a threaded coupling 71 having an externally threaded portion 71a that screws into the coupling 67 and a toothed ring 71b that is used to grip the coupling 71. Outwardly of toothed ring 71b is a connecting portion 71c having an annular groove 71d.

Figure 5:
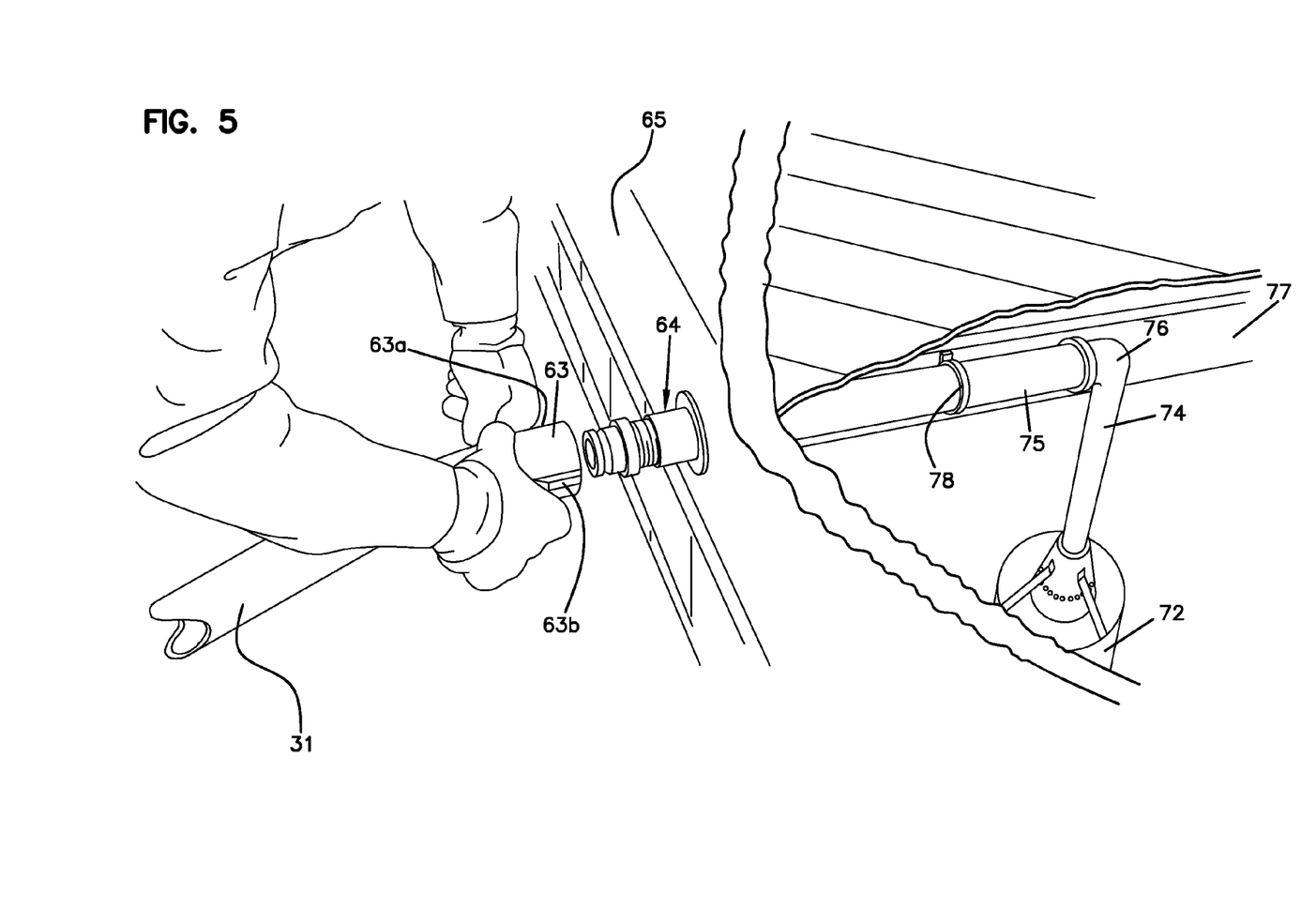
FIG. 5 is a perspective view of the coupling including the infeed pipe and salt bin.

With combined reference to FIGS. 4 and 5, hose coupling 63 is sized to fit over coupling 71 and includes a sealing O-ring (not shown) that seats into the annular groove 71d. Coupling 63 has a pair of clamping wings 63a, 63b which, when pressed flat against coupling 63, causes the O-ring to compressibly seal against the annular groove 71d. Outward lifting of the wings 63a, 63b releases the internal O-ring and permits the coupling 63 to be removed from coupling 64.

With continued reference to FIG. 5, the coupling 64 is located in proximity to a salt bin 72, which in turn is located adjacent a water softener (not shown). Typically, water softeners are located in mechanical areas of basements. Thus, in this embodiment, the coupling 64 is positioned relatively close to the ground where it is accessible to the salt delivery operator.

With reference to FIG. 5, rigid pipes 74 and 75 are connected using an elbow fitting 76. The rigid pipe 75 is secured to a floor joist 77 or similar structure by a plurality of straps 78. With additional reference to FIG. 4, the rigid pipe 75 is coupled to the internal pipe 66 of coupling 64 by a pipe clamp 79. In some embodiments, the rigid pipe 75 and elbow fitting 76 are each formed of a material consisting of plastic, stainless steel, metal, aluminum, or any combination thereof.

Figure 6:
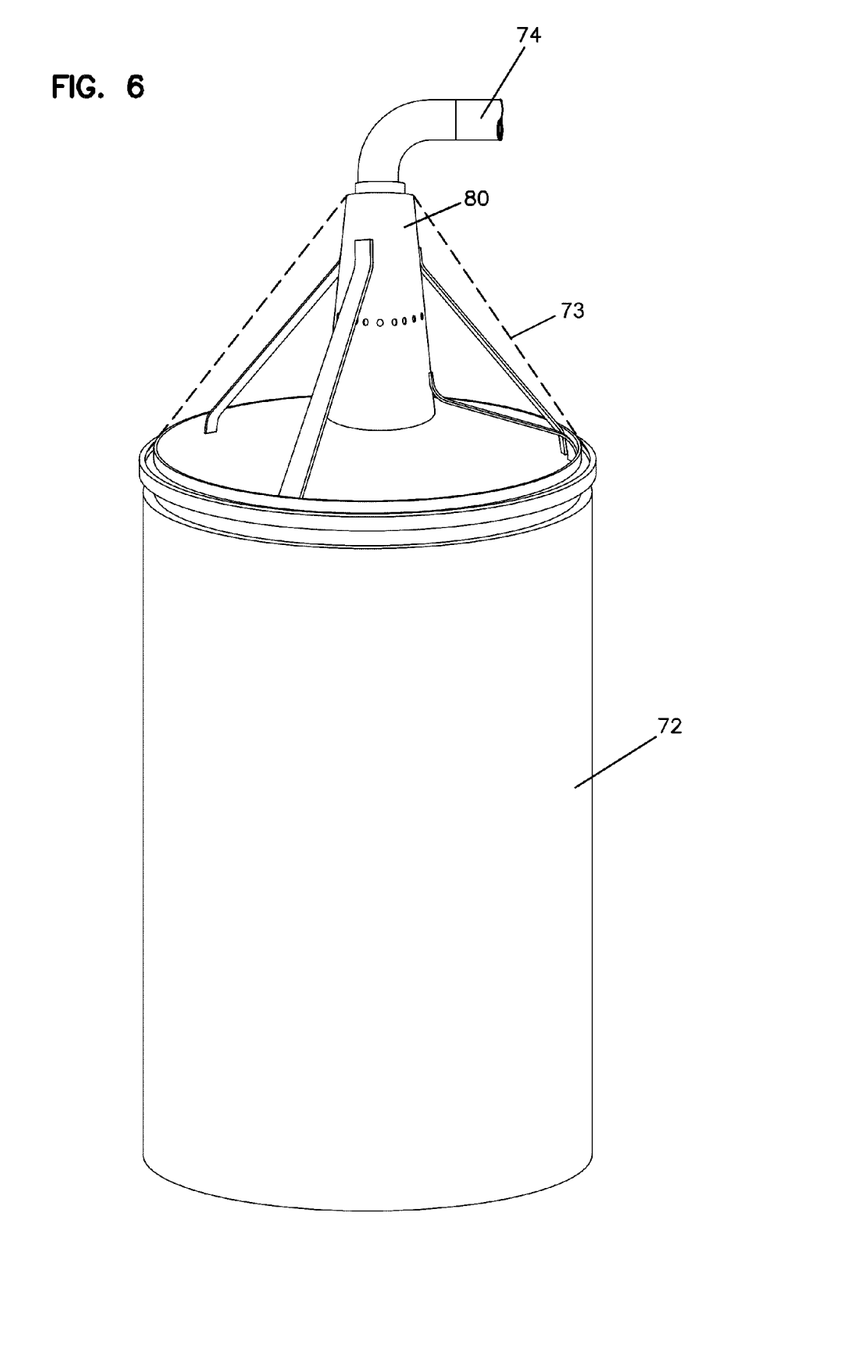
FIG. 6 is a perspective view of a salt bin and funnel cone disposed above a salt bin.

FIG. 6 is a perspective view of a salt bin 72 and funnel cone 80 disposed above a salt bin 72. The funnel cone 80 is operably attached to the fill pipe and is positioned above the salt bin 72. In some embodiments, the funnel cone 80 is positioned in a range approximately six inches to about 24 inches above the salt bin 72. The funnel cone 80 is used to determine when the salt bin 72 is full, and thus aids the operator in knowing when to stop the delivery of salt into the salt bin 72. In particular, after the salt bin 72 fills with salt, the salt climbs inside the funnel cone 80. As the salt occupies the empty space in the salt bin 72, increased air pressure is required to move the salt. Thus, a predetermined increase in pressure, such as above about three psi, indicates that the salt bin 72 is full. Accordingly, in some embodiments, the operator pulls the handle member 33 to reverse the air flow and begin the reclaiming process. The reclaiming process is used to reverse the salt delivery process to retrieve excess salt in the funnel cone 80 and the rigid pipes 74 and 75. This excess salt is then stored in the recovery tank 4.

In some embodiments, the salt bin 72 is provided with a flexible dust/filter bag 73 (dotted line) having a large open lower end with an elastic periphery that fits over the top opening of the salt bin 72, and a smaller top elastic opening that receives a flexible salt delivery pipe 74. The dust/filter bag is used to prevent salt dust from escaping to surrounding areas.

In operation, the hopper 19 must be filled with a requisite amount of salt prior to delivery. This is accomplished by releasing the two clamping handles 27 and lifting lid 24 to the position shown in FIG. 2. Such filling may be accomplished by an overhead hopper under which the apparatus 11 is driven, or a conveyor or delivery hose that can be brought to the mouth of hopper 19. The handle member 33 is pulled to close the gate valve 30 prior to delivery. When the hopper 19 is filled to an appropriate level, lid 24 is lowered and handles 27 operated to sealably clamp lid 24 over the hopper opening. The certified computerized scale system thereafter measures the weight of the salt in each hopper 19 before any salt is transferred out of a hopper 19. Weighing the salt before and after each delivery permits an accurate calculation of the actual amount of salt delivered to the salt bin, and hence an accurate charge to the home owner. Once the hopper 19 is filled with salt, the salt delivery truck 12 can be driven to the various locations where salt is to be delivered.

Upon arrival at a delivery location, the operator initially starts the truck engine. This in turn actuates the air pump 37, which delivers air under pressure through the hose 42 to the top of the hopper 19. Because the system operates at relatively low pressure (e.g., about 2-4 psi, and in some embodiments about 3 psi), it does not take a significant period of time for pressure in hopper 19 to build to this level.

The operator then uncoils the salt delivery hose 31 from the bed of pick-up truck 12 and brings the discharge end to the external house coupling 64. The plug 69 of the house coupling 65 is removed, and the threaded delivery coupling 71 is threadably inserted. The delivery hose coupling 63 is then placed over the threaded coupling 71 and wings 63a, 63b are moved to the clamping position.

The operator then returns to salt delivery apparatus 11, and with the truck engine power take off and air pump 37 continuing to run, pushes the handle member 33 to open the gate valve 30 at the outlet of hopper 19. Gravity causes the salt within the hopper 19 to pass through the gate valve into the salt delivery hose 31, and the pressure created by air pump 37 thereafter moves the salt through the delivery hose 31 to the coupling 64 and pipes 75 and 74. The salt then moves through the funnel cone 80 and is ultimately stored in the salt bin 72 positioned within the residence or business. As indicated above, the air pump 37 sends pulses of air under pressure, and this enhances the movement of the salt through the salt delivery hose 31.

A filter bag 73 may optionally be positioned over the salt bin 72 and funnel cone 80 to provide surrounding areas with protection from dust produced from the abrasion between salt during transport. Such a filter bag may serve to contain this dust during salt delivery, while at the same time permitting the escape of air displaced by the salt.

The salt delivery continues with the operator at the site of apparatus 11 in close proximity to the handle member 33, as shown with reference to FIG. 3. As the salt occupies the empty space within the salt bin 72 and climbs up the funnel cone 80, more air pressure is required to move the salt. Thus, when a predetermined increase in pressure is reached and indicated on the pressure gauge 49, the operator pulls the handle member 33 to close the hopper gate valve 30 which stops the delivery of salt to the salt bin 72. The operator then begins the reclaiming process.

The reclaiming process is used to reverse the salt delivery process by retrieving excess salt in the funnel cone 80 and pipes 74 and 75. As discussed above, the hoppers 19 and the recovery tank 4 are fluidly connected via a main feed pipe 2. This main feed pipe 2 is used to transfer the salt to and from the delivery hose 31. Since only one hopper 19 is used for the delivery of salt during a given delivery, there are a series of valves located at the main feed pipe 2 and associated with each hopper 19. These valves regulate the flow of salt from the hopper 19 to the main feed pipe 2. Accordingly, only one valve is open during delivery to limit the delivery of salt to the desired hopper 19.

To begin the reclaiming process, the operator closes the valve associated with the hopper 19 used for delivering salt. The operator then opens a valve that controls access to the recovery tank 4. The operator then reverses the direction of the air pump 37 to create a suction or a vacuum effect so that the salt is sucked from the funnel cone 80, through pipes 74 and 75, through the salt delivery hose 31, and finally transferred to the recovery tank 4. The recovery filter 6 is used to filter salt dust so dust is not recirculated through the system. Once the pressure gauge 49 indicates the pressure has dropped below a predetermined pressure, the operator turns off the air pump 37 and the reclaiming process is complete.

Once the reclaiming process is complete, the operator closes the gate valve that controls access to the recovery tank 4 to ensure the reclaimed salt remains in the recovery tank 4. The operator, using the computerized scale system, then weighs the salt in the hopper 19 and recovery tank 4 to calculate the actual amount of salt delivered to the salt bin 72. In particular, the computerized scale calculates the difference between the weight of the salt in the hopper 19 and the recovery tank 4 before and after delivery to arrive at the amount of salt delivered to the salt bin 72. In particular, the difference in weights of the salt in the hopper before and after delivery corresponds to the salt delivered from the hopper 19; this weight is adjusted by the difference between the before and after weights of the salt in the recovery tank 4, which represents the salt reclaimed during the reclamation process. The computerized scale system then prints a receipt indicating the amount of salt that was delivered to the salt bin 72. In other embodiments, the computerized scale system indicates the amount of salt delivered on a display. Accordingly, the purchaser only pays for the net amount of salt delivered to the salt bin 72.

As a further step, the operator removes the delivery hose coupling 63 from the external house coupling 64 and re-inserts the plug 69 into the external residence or business coupling 64. As optional steps, the operator turns off the engine 36 and disconnects the delivery hose 7 from the hopper 19. Additionally, the operator recoils the delivery hose 31 into the bed of the salt delivery truck 12 and drives to the next delivery location.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for remotely filling a salt bin with salt, the method comprising:
    filling a hopper apparatus with salt, wherein the hopper apparatus is positioned on a vehicle, wherein the vehicle includes a salt delivery hose and a recovery tank and the hopper apparatus includes a gate valve and a pressure sensor;
    transporting the hopper apparatus to a first location, the first location being proximate to the salt bin, wherein a funnel cone is positioned above the salt bin;
    connecting a first end of the salt delivery hose to an outlet of the hopper apparatus;
    connecting a second end of the salt delivery hose to a connector;
    opening the gate valve at the hopper apparatus to allow salt to move from the hopper apparatus to the salt delivery hose;
    delivering air pressure from the hopper apparatus through the salt delivery hose to the salt bin, wherein the air pressure causes the delivery of salt from the hopper apparatus to the salt bin, wherein a funnel cone is positioned above the salt bin, and wherein a dust bag fits over a top opening of the salt bin and surrounds the funnel cone;
    reversing a direction of the air pressure to reclaim salt in the salt delivery hose to the recovery tank; and
    determining a weight of the salt after delivery using a computerized scale system.

2. The method of claim 1 further comprising transporting the hopper apparatus to a second location, the second location being proximate to a second salt bin.

3. The method of claim 1 further comprising printing a receipt indicating an amount of salt delivered to the salt bin.

4. The method of claim 1, wherein the pressure increase is at least about 3 psi.

5. The method of claim 1, wherein the connector is positioned on an external side of a wall of a residence or a business.

6. The method of claim 1, wherein the pressure increase is indicated by the salt moving up the funnel cone.

7. The method of claim 1, wherein the step of delivering is performed using an air pump.

8. The method of claim 7, wherein the air pump is powered by an engine of the vehicle.

9. The method of claim 8, further comprising:
    closing the gate valve at the hopper apparatus;
    powering off the engine of the vehicle;
    disconnecting the first end of the salt delivery hose from the outlet of the hopper apparatus; and
    disconnecting the second end of the salt delivery hose from the connector.

10. A system for remotely delivering salt to a salt bin, the system comprising:
    a vehicle;
    a computerized scale system;

a recovery tank;
a first hopper apparatus having an outlet, a gate valve, and a pressure sensor, wherein the hopper apparatus, the recovery tank, and the computerized scale system are positioned on the vehicle;
a structure having an interior wall and an exterior wall, wherein a first connector is positioned on the exterior wall and a second connector is positioned on an interior wall;
a salt bin positioned inside the structure;
a funnel cone having a narrow opening on a first end and a wide opening on a second end wherein the funnel cone is positioned above the salt bin and wherein a predetermined increase in pressure at the funnel cone is detected by a pressure gauge;
a dust bag positioned to fit over a top opening of the salt bin, wherein the dust bag surrounds the funnel cone;
a pipe having a first end and a second end, wherein the first end is connected to the narrow opening and the second end is connected to the second connector; and
a salt delivery hose having a first end and a second end, wherein the first end of the salt delivery hose is connected to the first connector positioned on the exterior wall and the second end of the salt delivery hose is connected to the outlet of the hopper apparatus.

11. The system of claim 10, wherein the at least one hopper apparatus is sized to hold at least 3500 pounds of salt.

12. The system of claim 10, wherein the computerized scale system calculates an amount of salt delivered to the salt bin.

13. The system of claim 10, wherein the computerized scale system displays the amount of salt delivered.

14. The system of claim 10 further including a second hopper apparatus.

15. The system of claim 14 further including:
a main feed pipe for connecting the first hopper apparatus, the second hopper apparatus, the recovery tank, and the salt delivery hose, wherein the main feed pipe contains a valve for each of the first hopper apparatus, the second hopper apparatus, and the recovery tank.

16. The system of claim 10, wherein the pipe comprises a flexible pipe connected to a rigid pipe by an elbow fitting.

17. The system of claim 16, wherein the rigid pipe is formed with a material selected from the group consisting essentially of plastic, steel, metal, aluminum, or any combination thereof.

18. The system of claim 10, wherein the structure is a residence or a business.

* * * * *